United States Patent [19]
Tate et al.

[11] 3,759,393
[45] Sept. 18, 1973

[54] FLUID TREATING FILTER

[75] Inventors: John E. Tate; Howard O. Scholl, both of Louisville, Ky.

[73] Assignee: American Air Filter Company, Inc., Louisville, Ky.

[22] Filed: Aug. 5, 1971

[21] Appl. No.: 169,318

[52] U.S. Cl..................... 210/491, 55/487, 55/514, 55/524, 55/527
[51] Int. Cl............................................. B01d 46/10
[58] Field of Search .....................................
55/485–487, 492, 514, 524, 527; 210/491

[56] References Cited
UNITED STATES PATENTS

| | | | |
|---|---|---|---|
| 2,138,874 | 12/1938 | Myers | 55/DIG. 31 |
| 3,388,536 | 6/1968 | Nash | 55/492 |
| 3,460,321 | 8/1969 | Canzoneri | 55/522 |
| 3,526,557 | 9/1970 | Taylor et al. | 156/167 |
| 3,690,852 | 9/1972 | Smith et al. | 55/485 |

FOREIGN PATENTS OR APPLICATIONS

| | | | |
|---|---|---|---|
| 1,097,917 | 1/1968 | Great Britain | 55/524 |
| 1,105,306 | 3/1968 | Great Britain | 55/524 |

*Primary Examiner*—Bernard Nozick
*Attorney*—Charles G. Lamb et al.

[57] ABSTRACT

An improved air filter including an expanded filamentous mat and a support frame in communication therewith extending along the perimeter of the mat, the expanded filamentous mat including a plurality of thickness wherein the filament density varies from thickness to thickness.

4 Claims, 2 Drawing Figures

PATENTED SEP 18 1973

3,759,393

INVENTORS
HOWARD O. SCHOLL
BY JOHN E. TATE

Charles G. Lamb
ATTORNEY

FLUID TREATING FILTER

BACKGROUND OF THE INVENTION

This invention relates to a fluid treating filter. In one aspect it relates to a fluid treating filter including an expanded filamentous mat having a support frame in communication therewith and extending along the perimeter of the mat. In another aspect the invention relates to a fluid treating filter including an expanded filamentous mat having a plurality of thicknesses therein, each thickness varying in filament density.

In the conditioning of air in air conditioners, furnaces, and the like, the air to be processed is usually passed through a filter to remove particles of dust and other foreign matter. For many years, filters utilizing fibrous material, such as fiberglas, as a filtering media, have been used for removing the undesirable particles from the air. These filters come in many sizes and shapes and are constructed by many different methods. One of the most common type of filters in use today is one in which the basic core of loosely packed glass fibers bound together by a resinous coating is confined between two closely perforated sheets of bright brass. The perforated sheets are generally scrap from bottle plants and contain close circular orifices placed as closely together as possible. The circular orifices account for nearly 90 percent of the total sheet area. The fiberglas media and the two closely perforated sheets of bright brass are held together by an inwardly facing U-channel constructed of fiberboard. The side pieces of fiberboard are either stapled together at their ends to hold them intact with the perforated sheets or they are attached to the perforated sheets with an adhesive. Further, in some cases a narrowed metal strip is added to extend diagonally across each base of the perforated sheets to give extra strength.

SUMMARY OF THE INVENTION

In the present invention, it is recognized that it is desirable to provide a filter which is inexpensive, but yet durable in present air filtering systems. Furthermore, it is recognized that it is desirable to provide a filter which is easily constructed. Also, it is recognized that it is desirable to provide a filter having support means constructed therein in selected portions of the filter mat, the support means being sufficient to support the mat in operating position.

The present invention advantageously provides a straightforward arrangement for the preparation of an inherently structurally stable filter which may be utilized in furnaces, air conditioners, and the like. The present invention further provides a fluid treating filter having support means included therein.

Various other features of the present invention will become obvious to those skilled in the art upon reading the disclosure set forth hereinafter.

More particularly, the present invention provides a fluid treating filter comprising an expanded filamentous mat and a support frame in communicative relation therewith; the mat having a first and a second thickness, each thickness containing a plurality of filament layers, the filaments being held in place by a binder; the concentration of the filaments in the portion being relatively varied.

It is to be understood that the description of the examples of the present invention given hereinafter are not by way of limitation and various modifications within the scope of the present invention will occur to those skilled in the art upon reading the disclosure set forth hereinafter.

Referring to the drawings.

Figure 1:
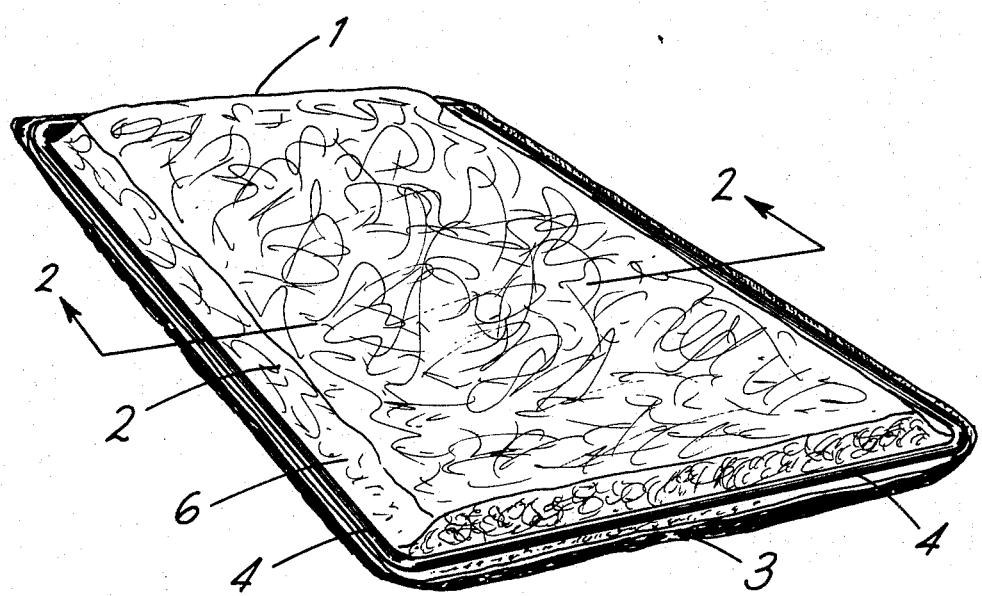
FIG. 1 is a perspective view of a filter of the present invention.
Figure 2:
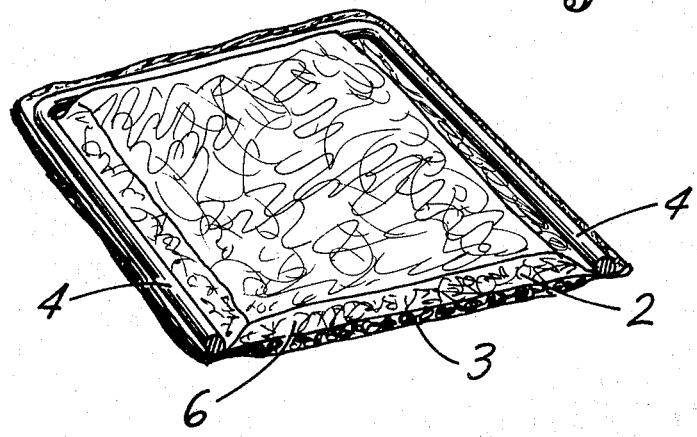
FIG. 2 is a reduced partially cut-away perspective view taken along lines 2—2 of FIG. 1.

FIGS. 1 and 2 of the drawing illustrate one structure of a fluid filter of the present invention. A fluid filter 1 illustrated in the Figures includes a fibrous mat 6 having a first portion or thickness 2 and a second portion or thickness 3. Fibrous mat 6 is of unitary construction, the filaments in portions 2 and 3 being similar but the concentration of the filaments being different in the two portions. In the example, portion 3 has a higher filament concentration than portion 2. The difference of the concentration in the portions will be discussed hereinafter.

Along the perimeter of the portion having the lesser concentration of filaments, portion 2 of the fibrous mat 6, is a metal frame 4, frame 4 being held in communicative relation with a face of portion 2 by a binder. Binders which may be used for attaching frame 4 to the filter fibrous mat 6 include, for example, hide glues, bone glues, polyethylene resins, polypropylene resins, ethylene vinyl acetate and the like. However, it is recognized that the frame may be sewn to the fibers or attached by other means without departing from the scope of the present invention. Furthermore, the frame 4 may be constructed of materials other than metal, such as a plastic.

It has been found that in one preferred method, a liquid binder is added to portion 2 along the perimeter that frame 4 is to be attached in an amount sufficient to extend into portion 3. In this method frame 4 is pressed firmly onto portion 2 but is also in contact with the binder in portion 3. Thus, frame 4 is actually attached to portion 3 through portion 2 and the rigidity of the support is enhanced.

Fibrous mat 6 is composed of two portions, portion 2 and portion 3 wherein portion 3 is, as mentioned previously, of a filament concentration higher than in portion 2. It is to be understood that portion 2 and portion 3, illustrated as being of unitary construction, may be of dissimilar materials and attached to each other by binding means. However, the preferred mat is of unitary construction with one preferred method of making the unitarily constructed mat having different concentrations of filaments in each portion being described in U.S. Pat. No. 3,526,557. This patent teaches that expanded filamentous mats are made by feeding fiberglas filaments from a filament feeder means to a rotating drum, collecting the filaments on the rotating drum at a selected angle of lay relative to a selected axis on the drum to form a first portion of a mat, and spraying the portion with a binder solution of a given viscosity. A second portion is then prepared by again feeding filaments from a filament feeder means to a rotating drum, collecting the filaments on the drum at a selected angle of lay relative to a selected axis of the drum to form a second portion of a mat, and applying to the second portion of the mat a binder having a different viscosity than the binder applied on the first portion. The filamentous mat is then stretched in a direction transverse to the general direction of lay of the filaments to separate the filaments and expand the mat in the direction of the thickness of the mat. The expanded mat is then heated to a selected temperature to decrease the viscosity of the binder on that portion of the mat having the lower viscosity binder to permit reorientation of the filaments of the portion while the binder of the other portion remains in a relatively more viscous condition to restrict reorientation of filaments of that particular portion. A portion of the mat having the lower viscosity binder is then compressed a selected amount while the binder is in less viscous condition, and the softened binder is then hardened while that portion is in a compressed condition. The amount of compression done and the type of binder selected is so determined that the compressed portion is rigid enough to support the fibrous mat in an operating position.

One example of a binder that may be used within the present invention for holding the filaments in place in a selected portion is the reaction product of urea and formaldehyde in a solution having a preselected solids concentration wherein the ratio of urea to formaldehyde is 1.7 parts by weight urea to 1.0 part by weight of formaldehyde. The preselected solids concentration will vary for each viscosity thereby enabling the same binder, but at different concentrations, to be used in the different portions of the mat.

In a fluid treating filter of the present invention, the filter is generally installed in a selected filter apparatus wherein the portion of the filter having the lower concentration of filaments is the upstream or dirty air side and the portion having the higher concentration of filaments is the downstream or clean air side. Further, generally the concentration of filaments in the downstream portion is sufficient to support the filter in operating position. Thus, the metal frame support 4 attached to portion 2 in combination with the support inherent in portion 3 makes for a filter having a balanced and uniform support throughout.

It will be realized that various changes may be made to the specific embodiments shown and described without departing from the principles and spirit of the present invention.

Having thus described our invention, what is claimed is:

1. A fluid treating filter comprising an expanded filamentous mat and a support frame in communicative relation therewith; said mat having first and second filament layers, the filaments of the layers being bonded by a binder, and the concentration of said filaments in said layers being different, said support frame being superposed the layer having the lower concentration of filaments and bonded to the layer having the higher concentration of filaments with the layer having the lower concentration of filaments being disposed therebetween and bonded to said support frame, the support frame extending only adjacently along the peripheral edge of said mat.

2. The fluid treating filter of claim 1 wherein the binder in the first portion and the binder in the second portion are of different viscosities.

3. The fluid treating filter of claim 1 wherein the mat is of unitary construction.

4. The fluid treating filter of claim 1 wherein the concentration of filaments in one of said portions is sufficient to support said filter in operating position.

* * * * *